United States Patent [19]
Nilsson

[11] Patent Number: 6,113,739
[45] Date of Patent: Sep. 5, 2000

[54] PROCESS FOR WASHING GAS FORMED BY GASIFYING BLACK LIQUOR

[75] Inventor: Bengt Nilsson, Skoghall, Sweden

[73] Assignee: Kvaerner Pulping AB, Karlstad, Sweden

[21] Appl. No.: 08/764,603

[22] Filed: Dec. 11, 1996

Related U.S. Application Data

[63] Continuation of application No. PCT/SE95/00586, Jun. 15, 1995.

[51] Int. Cl.$^7$ .................................................... D21C 11/12
[52] U.S. Cl. ........................ 162/30.1; 162/30.11; 162/47
[58] Field of Search ............................... 162/30.1, 30.11, 162/31, 47

[56] References Cited

U.S. PATENT DOCUMENTS 4,808,264  2/1989  Kignell .................................... 162/30.1

FOREIGN PATENT DOCUMENTS

94/20677  9/1994  WIPO .

*Primary Examiner*—Stanley S. Silverman
*Assistant Examiner*—Dean T. Nguyen
*Attorney, Agent, or Firm*—W. Warren Taltavull; Farkas & Manelli PLLC

[57] ABSTRACT

Process for recovering chemicals and energy from black liquor, where the black liquor is gasified with CO, $CO_2$, $CH_4$, $H_2$, and $H_2S$, in gaseous form, and $Na_2CO_3$, NaOH and $Na_2S$, in the form of drops of smelt, being principally formed. The mixture of gas and smelt is cooled, in a first stage, by direct contact with a cooling liquid, whereupon a part of the cooling liquid is volatilized, and the smelt drops are separated off and dissolved in the remaining part of the cooling liquid with the formation of a liquid bath of green liquor. In a second stage, the gas is washed and saturated with moisture by direct contact with a washing liquid bath. After the gas has been washed in the second stage, energy in the form of thermal energy and condensation heat is recovered from the gas in an indirect condenser. The contact between the gas and the liquid bath, consisting of green liquor, in the first stage is substantially less than the contact between the gas and the washing liquid bath, in the second stage. This is achieved, by the gas in the first stage not being permitted to bubble through the liquid bath, consisting of green liquor, in contrast to the second stage, in which the gas is caused to bubble through the washing liquid bath.

13 Claims, 3 Drawing Sheets

PROCESS FOR WASHING GAS FORMED BY GASIFYING BLACK LIQUOR

This is a continuation of PCT/SE95/00586 filed Jun. 15, 1995.

TECHNICAL FIELD

The present invention relates to a process for recovering of chemicals and energy from black liquor which is obtained during paper pulp production by means of chemical digestion of fibre raw material.

STATE OF THE ART AND PROBLEMS

When paper pulp is produced in accordance with the sulphate method, a spent liquor, generally termed black liquor, is obtained which contains organic material and the residual chemicals which have been obtained when cooking the fibre raw material. In general, this black liquor is evaporated and conveyed to a separate process for recovering of the energy content of the organic material and recovering the cooking chemicals as so-called green liquor. For a long time, the so-called Tomlinson process has been the commercially dominant method used for this recovery of energy and chemicals. However, a disadvantage of this process, which is now very old, is that it requires very large combustion ovens which are complicated both from the technical point of view and as regards their operation.

Swedish patent SE 448,173 describes a more recent process which, besides requiring process equipment which is appreciably simplified, achieves an improved recovering of both energy and chemicals. This process is based on a pyrolysis reaction in which the black liquor is gasified in a reactor, resulting in the formation of an energy-rich gas, principally comprising carbon monoxide, carbon dioxide, methane, hydrogen and hydrogen sulphide, and of inorganic chemicals in the form of small drops of smelt, principally comprising sodium carbonate, sodium hydroxide and sodium sulphide. The resulting mixture of gas and smelt drops is rapidly cooled, in a first stage, by means of direct contact with a cooling liquid consisting of water and green liquor, which is formed when the smelt chemicals and hydrogen sulphide dissolve in the cooling liquid. The gas is subsequently washed, in a second stage, in a gas-washing apparatus of the scrubber type. The gas is then used as a fuel for generating steam and/or electric power. The physical calorific value of the gas can also be utilized when the gas is cooled down from the gasification temperature to the saturation temperature for aqueous steam at the selected pressure. At a saturation temperature of 200° C., corresponding to 40 bar, for example, steam having a pressure of 3–8 bar can be generated when the green liquor is cooled and when the gas is cooled and its water content is condensed downstream of the gas-washing tower.

Nevertheless, this process too, despite being appreciably simpler and smoother than the Tomlinson process, still leaves room for improvement. One disadvantage is, for example, that unwanted hydrogen carbonate is formed in the green liquor when carbon dioxide in the pyrolysis gas comes into contact with the green liquor when the gas and smelt drops are cooled in the first stage. In addition, extremely small, virtually hydrophobic, particles, which are present in the gas and which the gas-washing apparatus according to SE 448,173 is not able to separate off effectively, remain in the gas when it leaves the gas-washing apparatus. A further disadvantage is that the recovering of energy from the physical calorific value of the gas cannot be carried out in a manner which is fully optimal for producing high-quality process steam and, instead, it is only steam of relatively moderate pressure which can be produced.

SOLUTION

The present invention is a further development of the concept of SE 448,173 and effectively eliminates the disadvantages associated with this known technique.

The concept behind the method which has been devised is to bring about the possibility of producing green liquor without unwanted hydrogen carbonate being formed in this liquor, and to bring about the possibility of optimally utilizing the content of thermal energy and the steam-formation heat in the gas, at the same time as the content of small particles, so-called fumes or microsolids, in the gas is efficiently separated off.

The principle is that the gas/smelt mixture which leaves the reactor is cooled, in a first stage, by means of direct contact with a cooling liquid which principally consists of water in the form of condensate. Any great contact between the gas and the green liquor, which is formed when smelt drops and hydrogen sulphide dissolve in the cooling liquid, is avoided to the greatest extent possible. In this way, carbon dioxide in the gas is prevented from reacting with sodium carbonate in the green liquor and forming sodium hydrogen carbonate, and carbon dioxide is prevented from reacting with sodium hydroxide and forming sodium carbonate. Furthermore, carbon dioxide is prevented from reacting with sodium hydrogen sulfide and forming sodium hydrogen carbonate and also hydrogen sulfide desorption from the reaction between sodium hydrogen carbonate and sodium hydrogen sulfide is avoided. It is a good thing if the sodium hydroxide which has been formed is not converted to sodium carbonate, since sodium hydroxide is the desired final product following causticization of the green liquor. During the causticization, sodium carbonate is converted to sodium hydroxide by reacting with slaked lime.

By contrast, the gas washing in the second stage is configured so that the maximum degree of thorough contact is achieved between the gas and the washing liquid, which principally consists of water in the form of condensate. In a preferred embodiment, this object is achieved by means of quenching in two stages, with the gas in the first quenching stage not being permitted to bubble through the liquid bath of green liquor which has collected in the bottom of the vessel. In the second quenching stage, the gas is washed by being allowed to bubble through a second liquid bath which principally consists of water in the form of condensate. In this way, the hot gas is efficiently purified and saturated with moisture. Energy in the form of condensation heat and thermal energy is then preferably recovered from the hot, moisture-saturated gas by using a countercurrent indirect condenser. With the aid of a countercurrent falling-film condenser, for example, it is possible efficiently to generate high-quality steam, preheat feed water and produce warm water in a single unit. The small particles, microsolids principally consisting of sodium carbonate, which are contained in the gas function as condensation nuclei in the condenser and are therefore efficiently separated out of the gas, and collected and dissolved in the condensate.

It is true that it is previously known per se, from U.S. Pat. No. 4,328,008 (Texaco), to cool and separate reaction products from a gasification reactor in two consecutive quenching stages. However, this patent differs from the present invention, on the one hand, in that it relates to another area of application, the combustion of solid fuel, without there being the possibility of green liquor production which is the main object of the present invention, and, on the other, in that it also lacks the preferred concept of recovering energy from hot, moisture-saturated gas in an optimal manner using a countercurrent condenser. Furthermore, the two quenching stages in U.S. Pat. No. 4,328,008 are not configured in order to achieve minimum contact between the gas and the product in a liquid phase in the first stage, and maximum contact in the second stage, which is the case in the invention described herein.

The invention will be described below in more detail on the basis of a preferred embodiment and with reference to the attached figures.

DETAILED DESCRIPTION OF THE FIGURES

Figure 1:
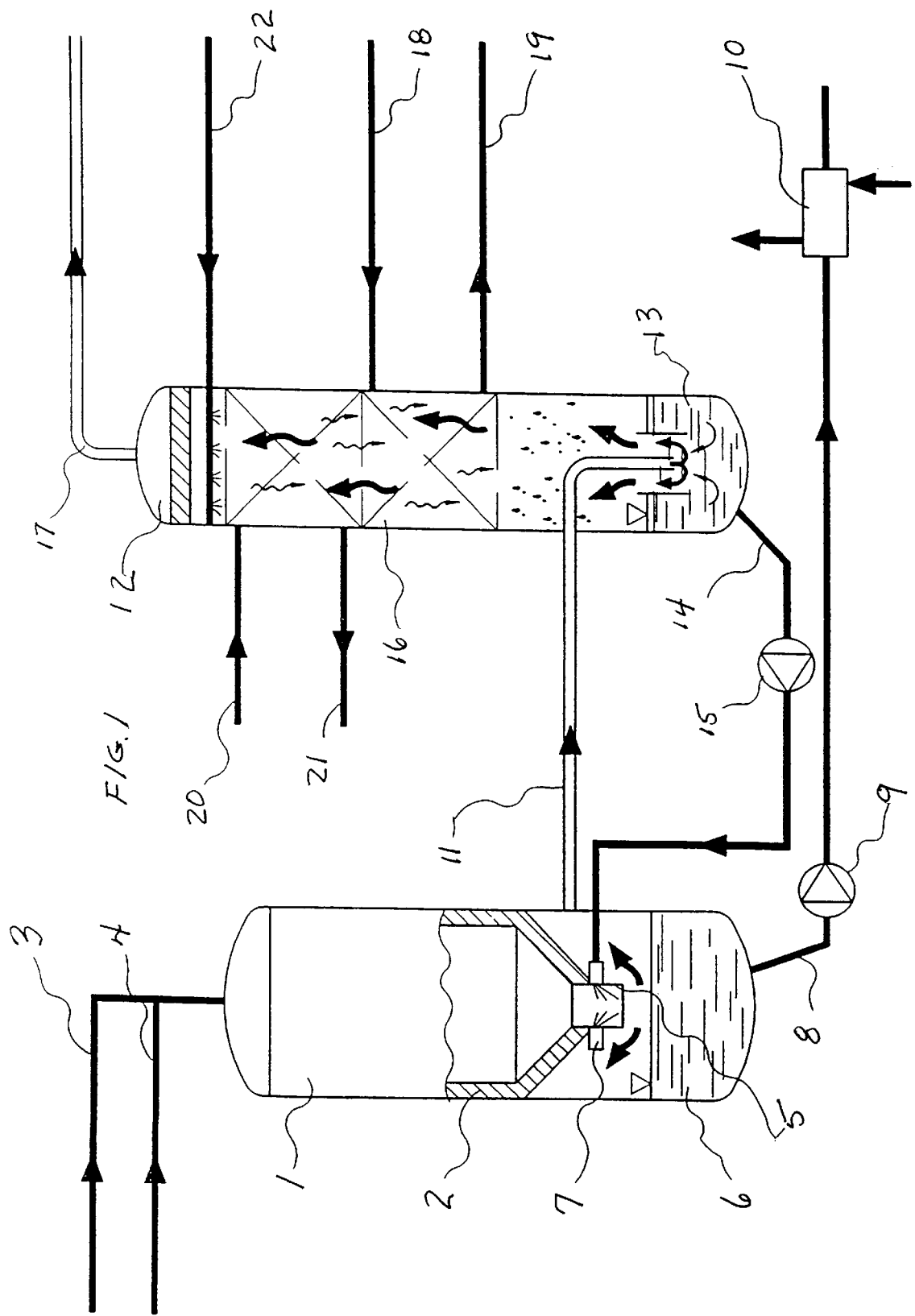
FIG. 1 shows a preferred embodiment of the concept according to the invention.

Detail number 1 in FIG. 1 indicates a pressure vessel which contains a ceramically lined gasification reactor 2. The reactor is provided with an inlet 3 for black liquor and an inlet 4 for oxygen or oxygen-containing gas, and a burner (not shown). The opening at the bottom of the reactor chamber is in the form of a chute 5, which opens out directly above the surface of the liquid in a green liquor liquid chamber 6 which is situated below. A number of nozzles 7 for cooling liquid open out into the chute. Green liquor which is produced is transported from the chamber 6 through a conduit 8, via a pump 9 and a heat exchanger 10, to subsequent process stages for generating white liquor, or to another process stage in which green liquor is employed. The combustion gas from the first vessel is conveyed through a conduit 11 to a second pressure vessel 12 for gas treatment and energy recovering. This conduit 11 opens out in the pressure vessel 12 under the surface of the liquid in a washing liquid chamber 13 at the bottom of the vessel. An indirect condenser of the countercurrent falling-film condenser type 16 is located above the chamber 13. An outlet 17 for cooled combustion gas is located at the top of the second pressure vessel 12.

The liquid in the washing liquid chamber of the second vessel can be conveyed, through a conduit 14 via a pump 15, to the first vessel in order to serve as diluting liquid or as cooling liquid which is provided via the spray nozzles 7. Feed water for generating steam is supplied to the condenser 16 via a conduit 18, and steam which is produced exits via a conduit 19. (The recovery of energy is shown in more detail in FIG. 2.) Cold water is supplied to the upper part of the condenser via a conduit 20, and warm water which is produced exits via conduit 21. Water which is added to maintain liquid balance is supplied to the system via a conduit 22.

Stage 1—Gasification and cooling.

Since the gasification method itself is clearly presented in patent SE 448,173, it will not be described in detail here. However, in the preferred example, the product resulting from flash pyrolysis carried out in the presence of an understoichiometric quantity of oxygen principally consists of a mixture of gaseous hydrogen, carbon monoxide, carbon dioxide, aqueous steam and hydrogen sulphide, and also smelt drops of sodium carbonate, sodium hydroxide and sodium sulphide, at a temperature of approximately 950° C. and at an absolute pressure of 26 bar. The velocity of the gas is high, and this helps to transfer the smelt drops, some of which form a film on the reactor walls, to the green liquor liquid chamber 6, which is arranged below the gasification reactor 2. The outlet from the reactor consists of a chute 5 into which cooling liquid is sprayed through a number of nozzles 7 in order to achieve maximum contact with the smelt/gas mixture. The cooling liquid principally consists of water, some of which water will be evaporated when it makes contact with the hot gas and the smelt at the reactor temperature. The smelt drops and the smelt film along the reactor walls dissolve in the remaining part of the cooling liquid and thereby form green liquor, which falls down into the liquid chamber 6. Alternatively, the smelt drops fall down directly into the liquid chamber 6 and only then dissolve in the green liquor which is already present in this location. The smelt drops are then cooled by the evaporation of water in the green liquor bath.

The chute 5 opens out directly above the level of the liquid in the liquid chamber 6. This is very important in order to avoid a high degree of contact between the gas and the green liquor which is formed. If the chute had opened out below the surface of the liquid, the gas would have been forced to bubble through the green liquor, as a consequence of which hydrogen carbonate would have been formed by means of reaction between carbon dioxide present in the gas and sodium hydroxide and sodium carbonate present in the green liquor. The temperature after cooling is controlled by the operating pressure which has been selected and is related to the temperature of the saturated steam at this pressure. Thus, at an operating pressure of 26 bar, the green liquor and the gas can be expected to have an equilibrium temperature of 200° C. in the cooling stage if the steam partial pressure is 60%.

The green liquor leaves the first pressure vessel 1 through a conduit 8, and is pumped, using a pump 9, through a heat exchanger 10, in which heat energy is recovered from the green liquor by cooling the latter. A minor part of the green liquor is employed for wetting the inside of the chute 5 by means of being returned to the chute and being permitted to form a thin film on the inside of the chute.

Stage 2—Gas washing.

The cooled gas, which is partially saturated with moisture, leaves the first vessel 1 via a conduit 11, which opens out in the second vessel 12. The conduit 11 opens out in the form of a liquid seal, consisting of a chute and an ascending pipe, under the surface of the liquid in the washing liquid chamber 13, which is located at the very bottom of the vessel. By virtue of the fact that the conduit opens out below the surface of the liquid in this manner, the gas is forced to bubble, via the liquid seal, through the liquid, which principally consists of water, in order to be able to rise upwards. This results in the gas being fully saturated with moisture at the same time as it is washed free of its content of remaining chemicals. Due to the intimate contact which is rendered possible between the gas and the washing liquid, some of the small particles, so-called microsolids or fumes, which are present in the gas and which are very difficult to separate out, also come to be washed out to a large extent. The temperature of the washing liquid bath 13, and of the gas which leaves the bath, is, in the main, the same as the temperature in the green liquor liquid chamber 6 in the first vessel 1. This makes it possible to achieve a high partial pressure of steam in the combustion gas.

The washing liquid in the liquid chamber 13 is returned to the first vessel 1 through a conduit 14 in order to provide diluting liquid for the green liquor in the liquid chamber 6, or in order to provide the cooling liquid which is sprayed into the chute 5 via the nozzles 7. After energy has been recovered in the condenser 16, the gas leaves the system in a flow 17. Any sulphur-containing compounds which may remain are subsequently washed out of the gas using an alkaline washing liquid, for example sodium carbonate.
Stage 3—Energy recovery.

Figure 2:
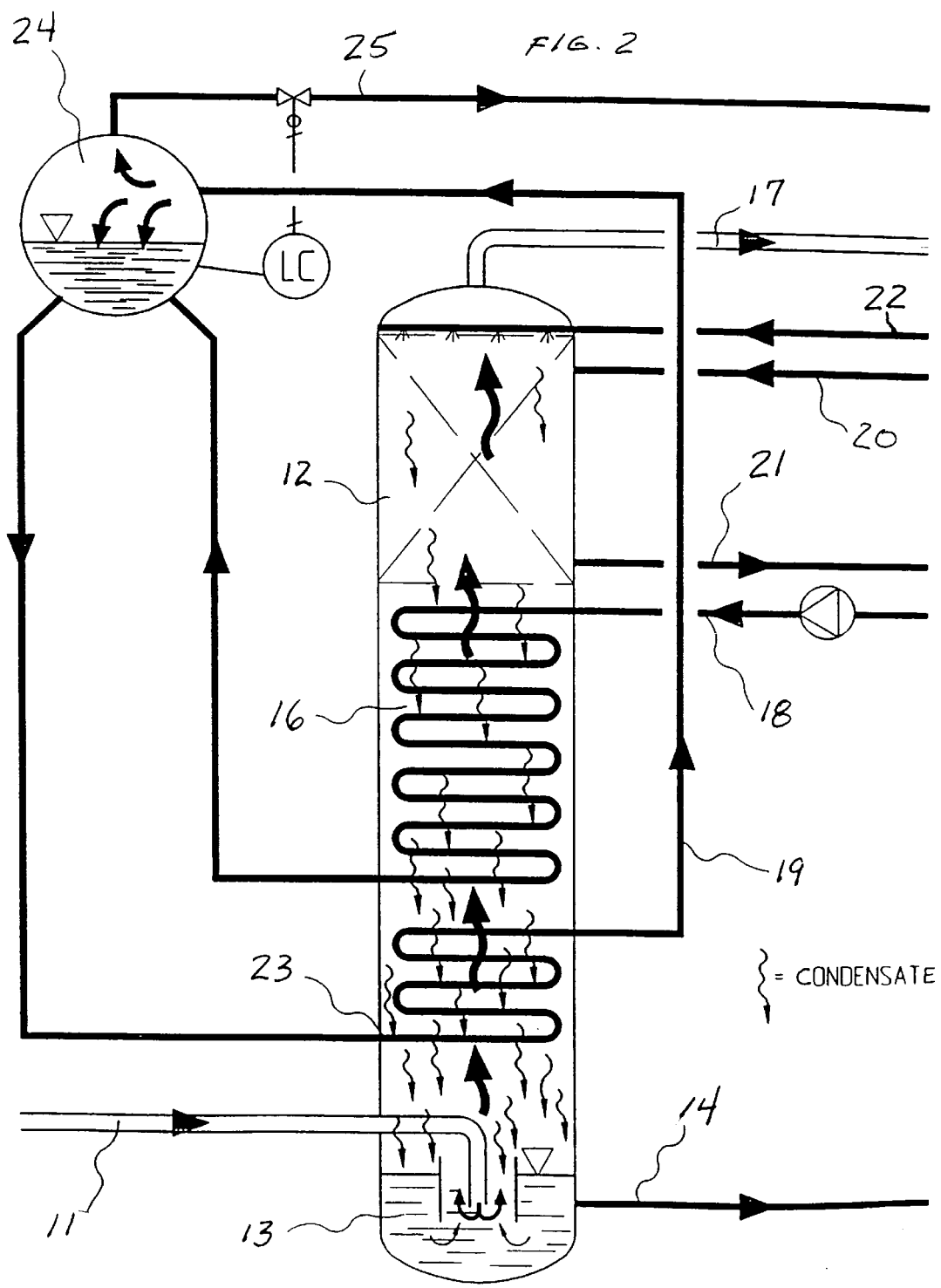
FIG. 2 shows a preferred embodiment for recovering energy from combustion gas by means of indirect countercurrent cooling.

FIG. 2 shows the concept for recovering energy, in accordance with the invention, in a preferred embodiment at a system pressure of 26 bar. The principle is based on using a countercurrent falling-film condenser 16, which is installed above the washing liquid bath 13 in the second pressure vessel 12. The moisture-saturated gas, at a temperature of 200° C., which leaves the washing liquid bath 13 is caused to condense as a result of indirect heat transfer to pre-heated feed water 23 at a temperature of approximately 180° C. This causes the feed water to volatilize, and the resulting steam, at approximately 10 bar of excess pressure and approximately 184° C., can leave the system, via a steam dome 24, in a flow 25 so that it can be used elsewhere in the mill. The condensate which leaves the gas falls down into the washing liquid chamber 13 and there comes to provide part of the washing liquid for the incoming gas 11. This gas comes, therefore, to be washed in its "own" hot condensate. While the liquid in the washing liquid chamber 13 principally consists of water, washed-out chemicals which were present in the gas phase and which were dissolved in the condensate are naturally also to be found in this liquid.

After partial condensation, the gas has a temperature of approximately 190° C. and can now be used for preheating the said feed water. This feed water enters the condenser via a conduit 18 and has a temperature of approximately 70° C. Following indirect transfer of heat from the gas, the feed water reaches a temperature of approximately 180° C. and can be used, after having passed though the steam dome 24, for generating steam as described above.

After the feedwater has been preheated, the temperature of the gas is approximately 80° C., and the remaining calorific value down to approximately 30° C. can be utilized in the same condenser unit for generating warm water. Here, cold water enters the condenser, through a conduit 20, at approximately 15° C. and leaves the condenser, through a conduit 21, at approximately 70° C. Water which is added in order to balance the loss of liquid from the system, inter alia in the form of green liquor 8 which is removed, is supplied, in a quantity of approximately 2.1 m$^3$ per ton of pulp, to the upper part of the condenser in a flow 22. This water is heated to 200° C. by the countercurrent procedure before it joins the condensate in the washing liquid chamber 13.

The gas leaves the condenser, at approximately 30° C., in a flow 17, and its chemical energy is utilized, by means of the gas being combusted, with steam and/or electricity being produced, for example in accordance with the concept in SE 448,173.

ADVANTAGES

By virtue of the countercurrent principle for recovering energy, the heat of evaporation from the cooling stage in the first vessel is fully utilized as condensation heat in the second vessel. A countercurrent condensor gives higher condensate temperature, greater flow and consequently larger steam production, when compared to a concurrent condenser. A high thermal level, which makes it possible to generate high-quality steam, is based on the principle that the gas is washed, in the second stage, in its "own" hot condensate. Returning this condensate to the cooling stage also allows 90–100% of the cooling requirement for smelt/gas from the reactor to consist of evaporation heat.

Another advantage of returning condensate from the second liquid bath 13 via the conduit 14 to the first vessel in order to serve as diluting or cooling liquid in the spray nozzles 7, is that the very high temperature in the chute 5, where the spray nozzles are located, effects a cracking of tarry compounds, for example terpenes, which has been condensed out of the gas and thereby collected in the condensate. Other compounds, such as sulphur containing compounds, can also be decomposed in this way. Naturally, this positive effect can be utilized to crack unwanted compounds in other condensates, filtrates or effluents, if these are sprayed into the chute 5.

Moisture-saturated combustion gas contains approximately four times more aqueous steam than gas when the comparison is made on the basis of specific volume. This means, as a result of the countercurrent procedure, that while the steam/gas mixture has a velocity of approximately 10 m/s, for example, on entry into the condenser, the velocity of the gas decreases as the moisture condenses out, so that the velocity on leaving the condenser is approximately 4–5 m/s. This makes it easier for drops which are being carried along by the gas to separate out.

The 0.01–1.0 μm-sized small particles, so-called micro-solids or fumes, which still remain within the gas and which are otherwise extremely difficult to separate out, are utilized as condensation nuclei, thereby rendering it possible to separate out these particles. The low gas velocity, which is required in accordance with the countercurrent principle, provides these virtually hydrophobic particles with a longer dwell time for wetting than is usually the case when cooling is carried out in accordance with the concurrent principle.

A further advantage of the countercurrent procedure is that the susceptible lower cooling surfaces in the condenser, which are inclined to become smeared, are kept free from any coating by being flushed at high temperature with the whole of the condensate flow.

A compact, multifunctional gas treatment tower having a single location for collecting condensate constitutes, as regards apparatus construction and control and regulation of the process, a substantial simplification as compared with the conventional concept.

Production of hydrogen carbonate in the green liquor is avoided by separately quenching smelt in the first stage and gas in the second stage.

Experience shows that the liquid in the quenching stage in the first vessel has a tendency to froth when the pressure drops momentarily in the system. The present method allows this froth from the first stage to be absorbed by the washing liquid in the second quenching stage.

ALTERNATIVE EMBODIMENTS

The embodiment as described above is a preferred embodiment. Nevertheless, the invention is not limited to this description, and can be varied within the scope of the patent claims. The different constituent stages in the countercurrent condenser, when the condensation heat and thermal energy of the hot, moisture-saturated gas are recovered, can, naturally, be fewer or more in number, and the given temperatures of, for example, the feed water and the gas in the different constituent stages can have other values.

It can be advantageous for the separation of micro-solids to install layers of structured packing between the different constituent stages in the countercurrent condensor. This also has the positive effect that it prevents channelling.

While the gasification temperature in the reactor can be 500–1,600° C., preferably 700–1,300° C. and more preferably 800–1,000° C., and the system pressure can be up to 150 bar absolute pressure, preferably 21–50 bar, atmospheric pressure is also conceivable even if it is then not possible to generate high-quality steam. While the level of the temperature of the condensate and the green liquor should be as high as possible, this level is limited by the saturation temperature at each given system pressure. The temperature can, for example, be approximately 170–260° C. if the system pressure is 21–50 bar and the partial pressure of steam in the cooling stage in the first vessel is approximately 35–90%. At, for example, a partial pressure of steam of 83%, and 26 bar absolute pressure, the temperature is 216° C.

In addition to being supplied to the upper part of the condenser, water for maintaining the liquid balance can also be supplied directly to the condensate, for example to the conduit 14.

It is also possible to conceive of employing the principle of the condenser 16 in conjunction with other system solutions having similar requirements.

The condenser 16 does not need to be accommodated in the same vessel as the washing liquid bath 13, even if this is advantageous, and, instead, cooling and condensation of the moisture-saturated gas can be carried out in a separate condenser, with the condensate from this condenser being returned to the vessel which contains the washing liquid bath 133. If appropriate, this separate condenser can consist of a conventional condenser, which is not a countercurrent falling-film condenser, which naturally results in the advantages accruing from using the latter condenser not being achieved.

The design of the two quenchers/rapid cooling baths, with chute and liquid bath, can be configured in different ways as regards apparatus construction. For example, dry separation can be effected in the first vessel 1 by means of the smelt drops being allowed to fall down into the cooling bath 6 without cooling liquid being sprayed into the stream of smelt drops. The gas is then conducted away from the stream of smelt drops, and the cooling liquid is instead sprayed directly into this gas stream, with any drops of smelt which have been carried along being dissolved and falling down into the cooling bath. In the second vessel 12, the quench can be designed to achieve an unlimited mammoth pump effect, that is to say with a possibility for the gas to lift the liquid, thereby achieving a good circulation and washing effect. Alternatively, a so-called Venturi quench can be utilized in one or both quenching stages, where appropriate with a diverter screen.

In the gas conduit 11 there can, moreover, be installed an extra gas treatment step. This extra step could for example consist of a Venturi scrubber with wash liquid being supplied from the second liquid bath 13. Utilization of such a Venturi scrubber enhances the separation of microsolids or fumes in the gas stream.

The two liquid baths 6 and 13 can also be accommodated in one and the same vessel, where they are separated, for example, by means of an intermediate wall. One possibility is to use a horisontal pressure vessel with an intermediate wall for the two liquid baths 6 and 13. The vertical pressure vessel 1, containing the reactor 2, would then be joined to the horisontal vessel at one end and the vertical pressure vessel 12, containing the condensor 16, at the other end.

Figure 3:
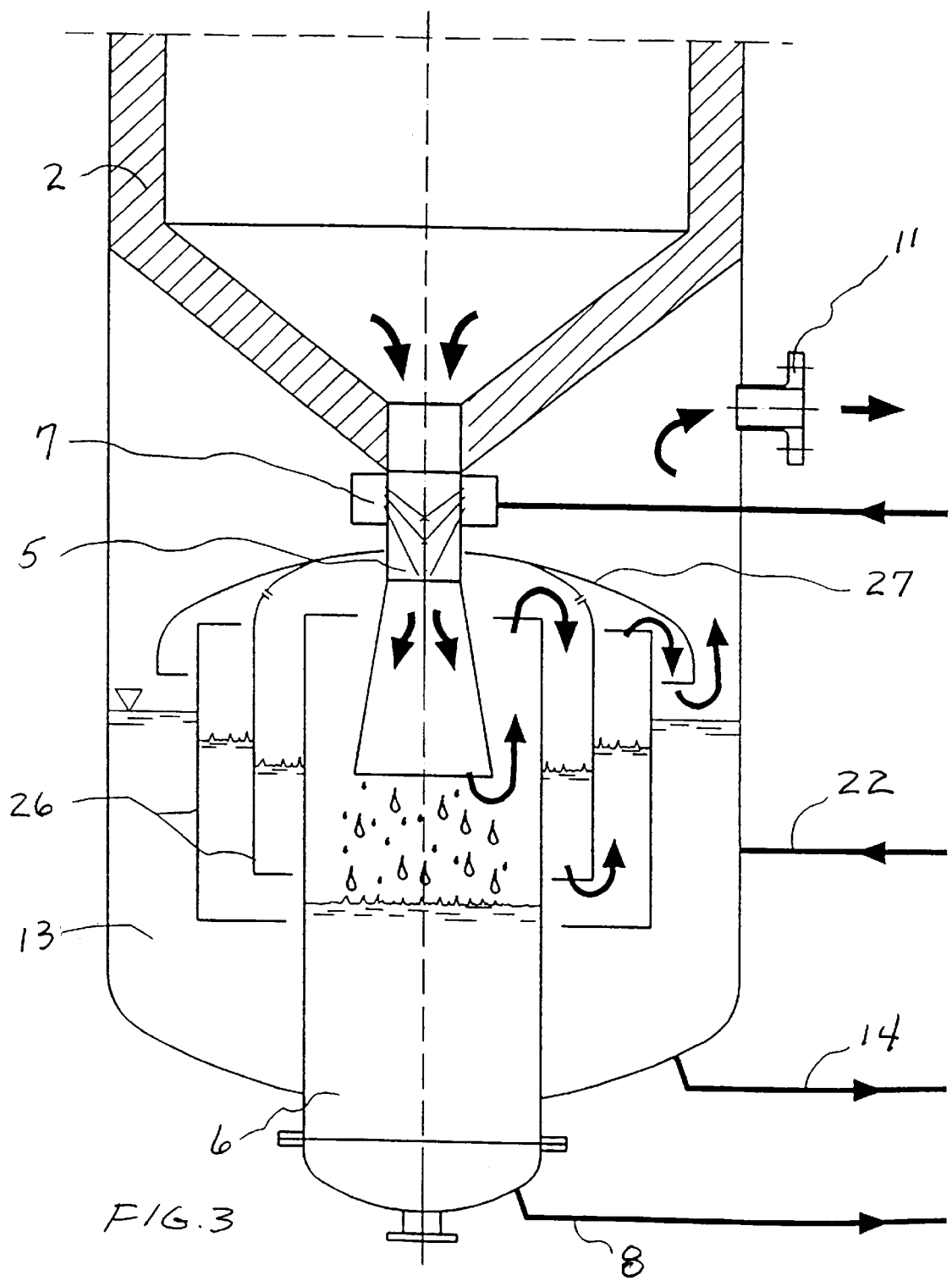
FIG. 3 shows an embodiment of the invention where the two quenching stages are accommodated in the same vessel.

Another possibility of accommodating the two liquid baths 6 and 13 in one and the same vessel is shown in FIG. 3. The green liquor liquid bath 6 is located around the centre of the vertical axis of the upright vessel containing the reactor 1. The gas is forced to pass through the liquid in the washing liquid bath 13, which is located around the periphery of the vessel. The two liquid baths are completely separated from each other by an intermediate wall and a number of extra, concentrically arranged walls 26, which extend down into the washing liquid bath 13, serve, together with a diverter screen 27, as a multi stage mammoth pump for forcing of the gas through the liquid.

Even if it, according to the invention, is preferred that the washing liquid bath 13 principally consists of water in the form of condensate, it can be contemplated that the liquid bath 13 could consist of a green liquor of a different type than the green liquor in the first liquid bath 6. This different type of green liquor would in that case, due to the intense contact with the gas, contain greater amounts of sodium hydrogen carbonate and sodium hydrogen sulfide, which means that it, for example, can be used for subsequent extracting of $H_2S$ and $CO_2$.

Naturally, the concept of the invention can also be applied in relation to the recovery of chemicals in processes involving completely different types of spent liquors and recovered chemicals, for example bleaching plant spent liquors, spent liquors from the production of semi-chemical pulp, for example CTMP, or spent liquors from a pulp process which is founded on using potassium as the base in place of sodium.

The concept of the invention can also be applied when utilizing increased partial pressure of $H_2S$ in the reactor with moved equlibrium (see SE 468 600) and $Na_2S$-production as a result.

What is claimed is:

1. The process for recovering chemicals and energy from black liquor which is obtained in paper pulp production by means of chemical digestion of fiber raw material where gasification of the black liquor produces CO, $CO_2$, $CH_4$, $H_2$ and $H_2S$, in gaseous form, and $Na_2CO_3$, NaOH and $Na_2S$, in the form of drops of smelt comprising the steps of (a) cooling the resulting mixture of gas and smelt in a first stage by direct contact with a cooling liquid which is constituted principally by water, whereupon a part of the cooling liquid is volatilized, (b) separating the smelt drops off and dissolving them in a part of the cooling liquid with the formation of a liquid bath of green liquor and, in a second stage, (c) washing and saturating the gas from the first stage with moisture by direct contact with a washing liquid bath which is constituted principally by water and (d) recovering energy in the form of thermal energy and condensation heat from the moisture-saturated gas in an indirect condenser, wherein the contact between the gas and the cooling liquid in the first stage is substantially less than the contact between the gas and the washing liquid bath in the second stage.

2. The process as claimed in claim 1 wherein the indirect condenser produces hot condensate and including the step of collecting the hot condensate from the indirect condenser and adding the hot condensate to the washing liquid bath in the second stage.

3. The process as claimed in claim 2 wherein the indirect condenser includes an upper part and including the step of maintaining the liquid level in the bath by adding water to the upper part of the indirect condenser.

4. The process as claimed in claim 2 including the step of passing the liquid from the washing liquid bath to the first stage to provide cooling liquid and liquid for a green liquid bath located in this stage.

5. The process as claimed in claim 2 wherein including the step of providing the indirect condenser with a countercurrent falling-film condenser.

6. The process as claimed in claim 1 including the step of using a countercurrent process to effect the indirect cooling including the step of using the condensation heat and the thermal energy of the gas to generate steam and including the use of any residual thermal energy for preheating feed water for the steam generation and production of warm water.

7. The process as claimed in claim 1 including the step of preventing gas in the first stage from bubbling through the liquid bath including the green liquor.

8. The process as claimed in claim 1 wherein the gas in the second stage is forced to bubble through the washing liquid bath.

9. The process as claimed in claim 8 and including the step of forcing the gas in the second stage to alternately bubble down and up through the washing liquid bath in at least one step in each direction, with the bubbling steps being created by an arrangement of a diverter screen together with concentrically arranged cylindrical walls which extend down into the washing liquid bath.

10. The process as claimed in claim 1 including the steps of limiting the pressure in the process to 150 bar or below.

11. The process as claimed in claim 1 including the step of maintaining the temperature in the washing liquid bath at substantially the same temperature as the gas entering the washing liquid bath and the temperature in the green liquor liquid bath.

12. The process as claimed in claim 1 including the step of providing an additional gas treatment stage wherein scrubbing with washing and cooling liquid is supplied from washing liquid bath and is located between the first stage and the second stage.

13. The process as claimed in claim 1 including the step of placing the two liquid baths in the same vessel separated by an intermediate wall.

* * * * *